(No Model.) 6 Sheets—Sheet 1.
R. H. FOWLER & G. S. TUER.
TRACTION ENGINE WITH WINDING DRUM.

No. 604,660. Patented May 24, 1898.

Witnesses:
B. W. Miller
E. A. Balloch

Inventors,
Robert H. Fowler,
George S. Tuer,
By their Attys.
Baldwin, Davidson & Wight (No Model.)  6 Sheets—Sheet 5.
R. H. FOWLER & G. S. TUER.
TRACTION ENGINE WITH WINDING DRUM.
No. 604,660.  Patented May 24, 1898.
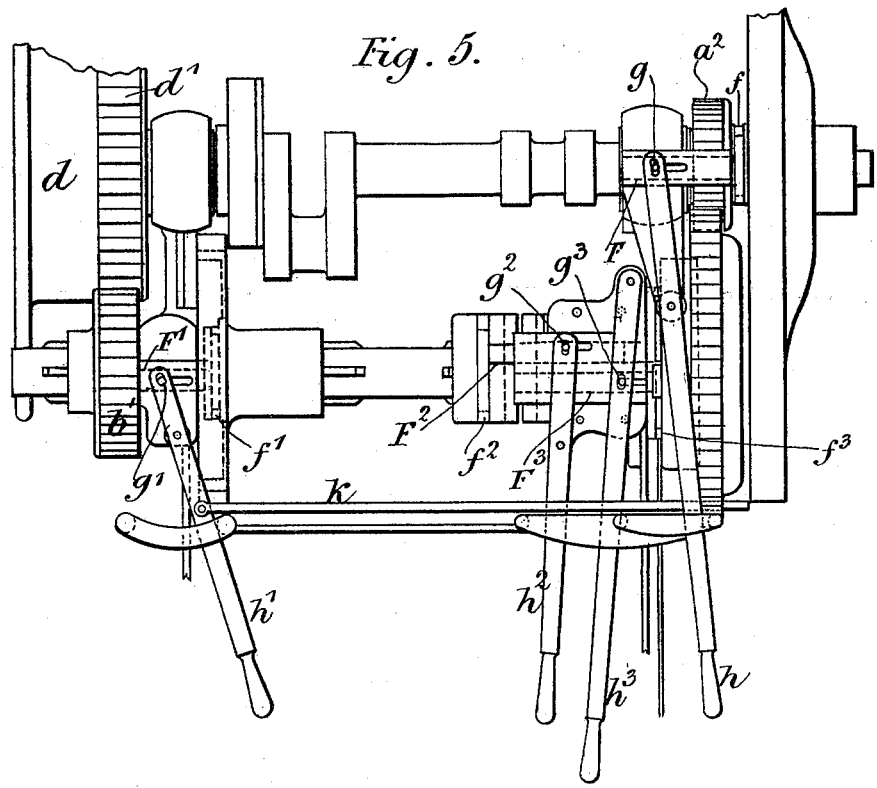
Fig. 5.
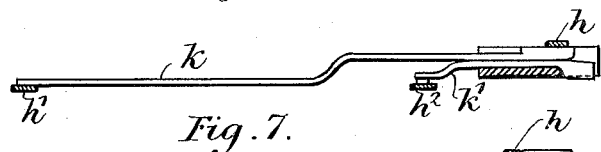
Fig. 6.
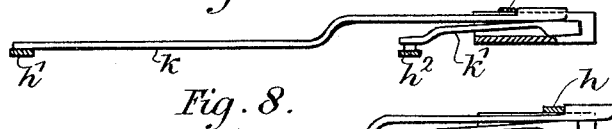
Fig. 7.
Fig. 8.
Witnesses:  Inventors,

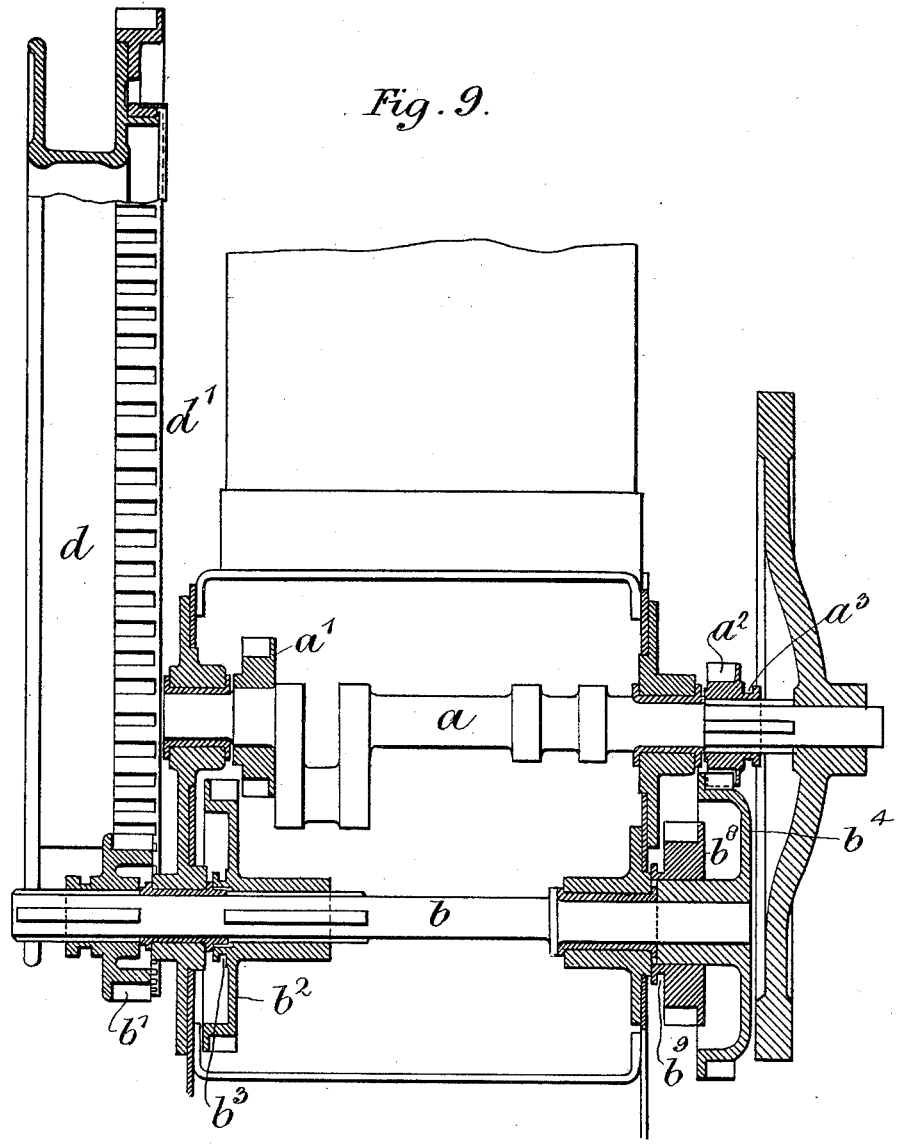

UNITED STATES PATENT OFFICE.

ROBERT HENRY FOWLER AND GEORGE SCHOFIELD TUER, OF LEEDS, ENGLAND.

TRACTION-ENGINE WITH WINDING-DRUM.

SPECIFICATION forming part of Letters Patent No. 604,660, dated May 24, 1898.

Application filed September 20, 1897. Serial No. 652,326. (No model.) Patented in England December 6, 1895, No. 23,422.

*To all whom it may concern:*

Be it known that we, ROBERT HENRY FOWLER, engineer, and GEORGE SCHOFIELD TUER, draughtsman, subjects of the Queen of Great Britain, residing at The Steam Plough Works, Leeds, in the county of York, England, have invented certain new and useful Improvements in Traction-Engines with Winding-Drums, (for which we have received Letters Patent in Great Britain, No. 23,422, dated December 6, 1895,) of which the following is a specification.

This invention relates to engines having a vertical winding drum or drums at one side. In such engines as heretofore constructed the drum has been driven by a pinion on the crank-shaft gearing with a ring of teeth on the drum and arranged so as to be thrown by a suitable clutch into and out of gear. In such engines, since the diameter of the ring of teeth on the drum cannot be indefinitely increased or the diameter of the pinion on the crank-shaft indefinitely decreased, it is practically impossible to make the ratio of the speed of the drum to that of the crank-shaft less than a fixed fraction—say one-tenth—and this in many cases is not small enough. According to this invention we obviate this objection by mounting the pinion driving the drum on the second-motion shaft of the road-gear. This renders it possible by suitably proportioning the pinions to vary the ratio between wide limits. We also so arrange the mechanism that either of the two different speeds used for moving the engine on its road-wheels can also be used at will for driving the winding-drum and can be instantaneously put into and out of gear, so that the engine can be used for plowing on the double-engine system with two plowing speeds. The clutch-levers are so arranged that the two plowing or motion speeds cannot both be in gear at once, but either fast or slow speed plowing-gear can be used when the engine is moving forward, but when traveling on the road it is impossible to put both fast and slow speed in gear at once.

Figure 1:
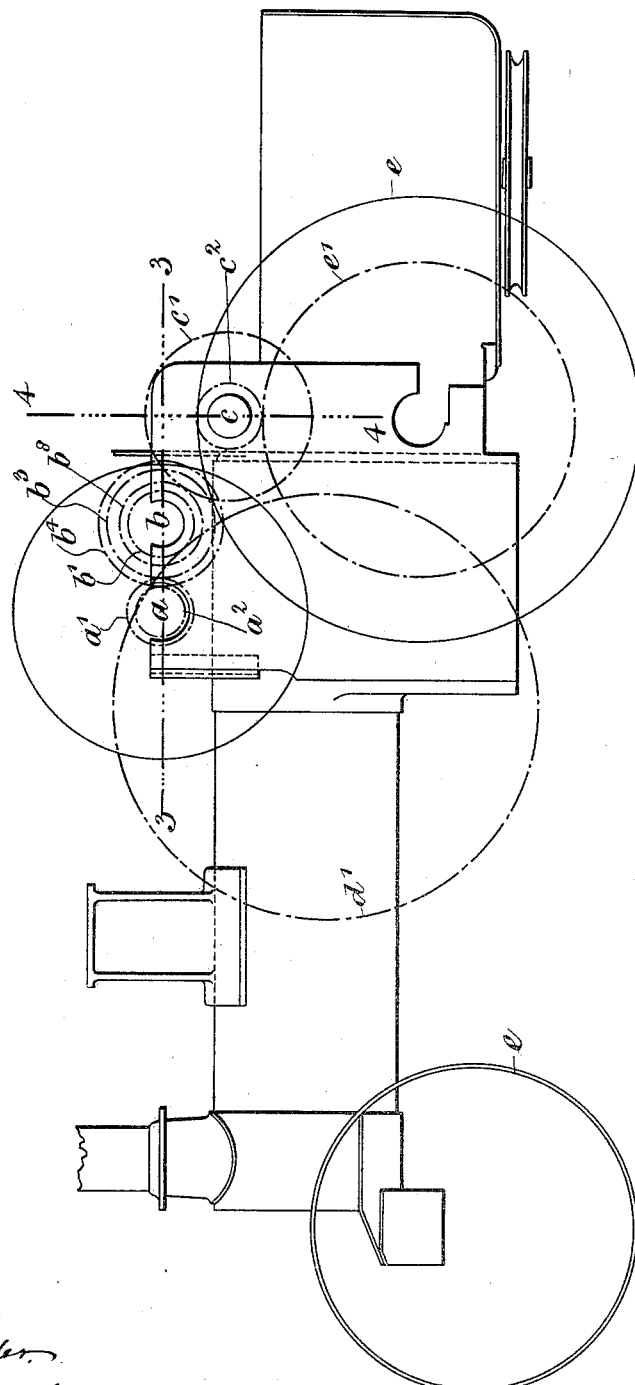
Figure 2:
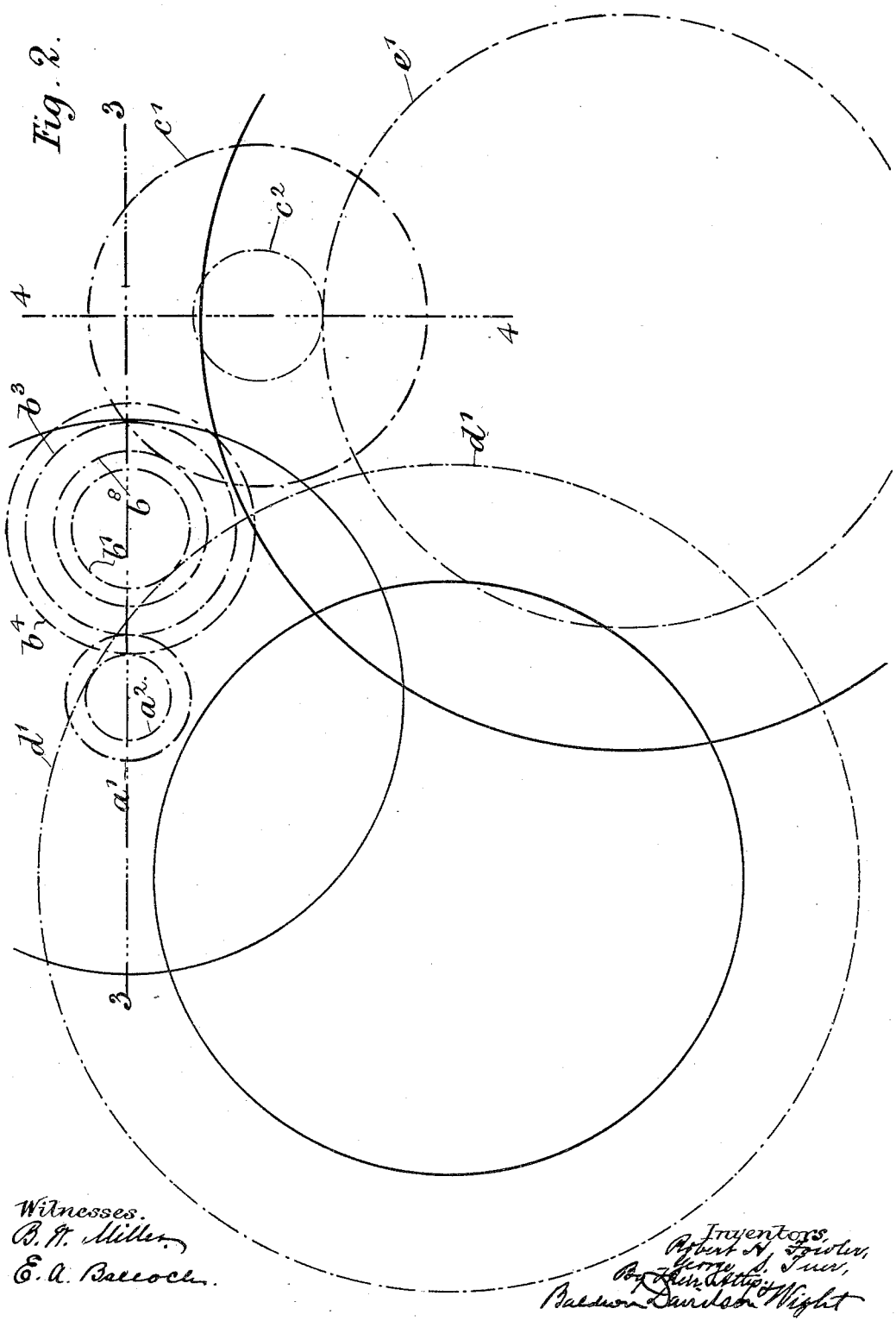
Figure 3:
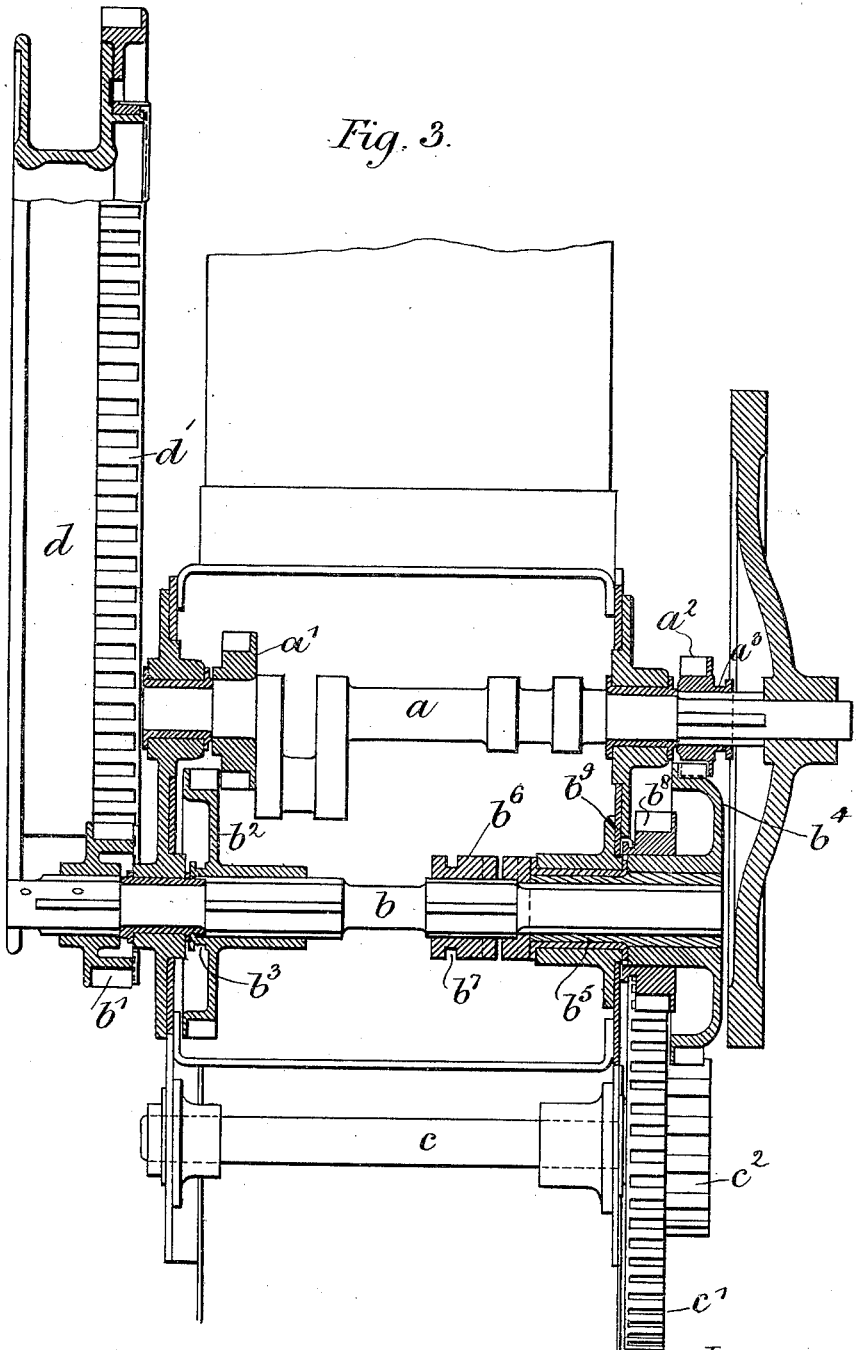
Figure 4:
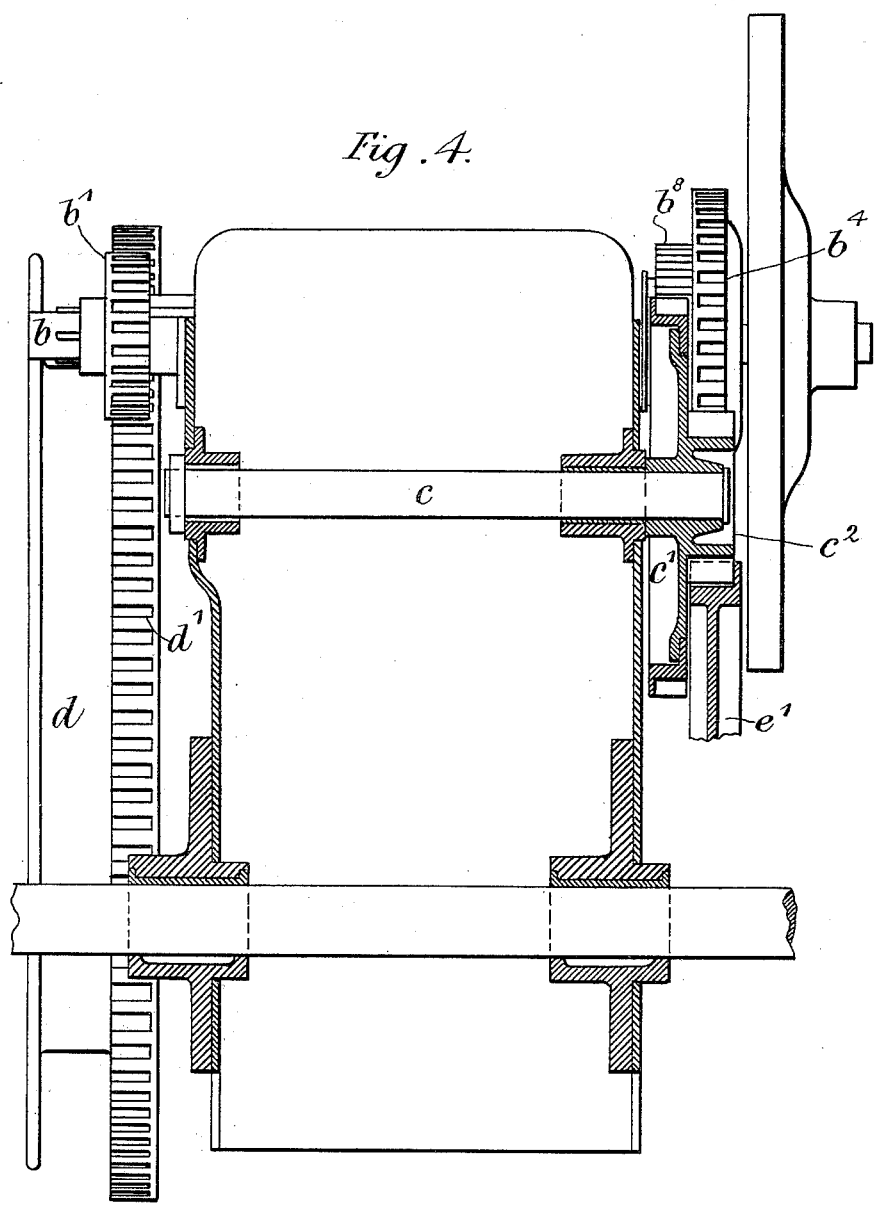

Figure 1 is a diagrammatic side elevation, to a smaller scale than the other figures, of the engine, showing the position of the gearing. Fig. 2 is a diagrammatic side elevation of the gearing only. Figs. 3 and 4 are sections on the lines 3 3 and 4 4, Figs. 1 and 2. Fig. 5 is a plan, and Figs. 6, 7, and 8 are diagrams, showing the different positions of the levers. Fig. 9 is a similar view to Fig. 3 and shows a modification.

$a$ is the crank-shaft, $b$ the second-motion shaft, and $c$ the third-motion shaft.

$d$ is a winding-drum mounted on a stud at the side of the boiler, and $e\ e$ are the road-wheels.

$a'$ is a pinion fixed to the crank-shaft, and $a^2$ a pinion connected to it by grooves and feathers, but capable of being shifted longitudinally on it by a clutch-fork engaging with the groove $a^3$ in it.

$b'$ is a pinion connected to the shaft $b$ by grooves and feathers. When the engine is being used for winding, the pinion $b'$ is in gear with a ring of teeth $d'$ on the drum $d$, but when the engine is moved from place to place it may be removed from the shaft.

$b^2$ is a wheel connected to the shaft $b$ by grooves and feathers, but capable of being shifted longitudinally on it by a clutch-fork engaging with the groove $b^3$ in it.

$b^4$ is a wheel fixed to a sleeve $b^5$, free to turn on the shaft $b$ unless it is connected to it by the clutch $b^6$, which is caused to slide to and fro on the shaft by a clutch-fork engaging with the groove $b^7$ in it, the clutch being connected to the shaft by grooves and feathers. The wheel $b^4$ gears with the pinion $a^2$ when the latter is in its left-hand, Figs. 3 and 9, or in gear position.

$b^8$ is a pinion connected to the boss of the wheel $b^4$ and moved to and fro on it by a clutch-fork engaging with the groove $b^9$, so putting the pinion into and out of gear with the wheel $c'$ on the shaft $c$.

$c^2$ is a pinion fixed to the shaft $c$ and gearing with a ring of teeth $e'$ on the road-wheel $e$.

$f\ f'\ f^2\ f^3$, Fig. 5, are the forks engaging with the grooves $a^3, b^3, b^7,$ and $b^9$, respectively. They are carried by stems F F' F² F³, working in slotted tubes fixed to the bearings.

$g\ g'\ g^2\ g^3$ are pins fixed to the stems F F' F² F³ and, protruding through the slots, engage with holes in the clutch-levers $h\ h'\ h^2\ h^3$.

$k$ and $k'$ are locking-bars pivoted, respectively, to the levers $h'$ and $h^2$.

For slow-speed traveling the pinion $a^2$ is in gear with the wheel $b^4$ and the pinion $b^8$ with the wheel $c'$, while the pinion $b^2$ and clutch $b^6$ are out of gear.

For fast-speed traveling the pinions $b^2$ and $b^8$ and the clutch $b^6$ are in gear and the pinion $a^2$ is out of gear.

For slow-speed winding the pinions $a^2$ and $b'$ and clutch $b^6$ are in gear and the wheel $b^2$ and pinion $b^8$ out of gear.

For fast-speed winding the pinion $b'$ and wheel $b^2$ are in gear and the clutch $b^6$ and pinion $b^8$ are out of gear.

Figs. 6, 7, and 8 show how it is impossible for the driver to put both traveling speeds or both plowing speeds into gear at once, but allows him to put the fast-speed or slow-speed plowing-gear into gear at the same time as the slow-speed road-gear.

When lever $h^2$ is out of gear, Fig. 6, the rod $k$ is free to move backward and forward under lever $h$. Therefore the levers $h$ and $h'$ can be put into and out of gear, but if $h^2$ is in gear at the same time as $h'$, as in Fig. 7, the rod $k$ is raised and prevents the lever $h$ being put into gear; but if lever $h$ is in gear at the same time as lever $h^2$, as in Fig. 8, the rod $k$ is again raised and prevents $h'$ being put into gear, but if $h$ and $h'$ are both in gear the rod $k'$ is pressed down and prevents $h^2$ being put into gear, as in Fig. 6.

Another arrangement is shown in Fig. 9 by which the same is effected, but the pinion $b'$ is worked into and out of gear with the teeth $d'$ by means of a clutch-lever. This arrangement is not so good, because to travel on the headland in slow gear when plowing in fast gear four levers instead of two have to be moved, although if plowing in fast gear the engine will travel on the headland in fast gear by moving two levers only and when plowing in slow gear will travel on the headland in slow gear by moving two levers only.

We claim—

1. In a traction-engine, the combination of a crank-shaft, a second-motion shaft, gearing connecting the road-wheels with the second-motion shaft, means for disconnecting this gearing, a vertical winding-drum at the side of the engine, a ring of teeth on the drum, and a pinion on the second-motion shaft engaging with the ring of teeth.

2. In a traction-engine, the combination of a crank-shaft, a second-motion shaft, a pinion fixed on the crank-shaft gearing with a wheel free to slide on the second-motion shaft, a pinion free to slide on the crank-shaft gearing with a wheel on the second-motion shaft, means for connecting this wheel to the shaft, a pinion revolving with the wheel and driving the road-wheels, and a pinion on the second-motion shaft driving a vertical winding-drum at the side of the engine.

3. In a traction-engine, the combination of a crank-shaft, a second-motion shaft, a pinion fixed on the crank-shaft gearing with a wheel free to slide on the second-motion shaft, a pinion free to slide on the crank-shaft gearing with a wheel fixed to a sleeve on the second-motion shaft, a clutch connecting the sleeve to the shaft, a pinion free to slide on the boss of the wheel and driving the road-wheels, and a pinion on the second-motion shaft driving a vertical winding-drum at the side of the engine.

4. In a traction-engine, the combination of road-wheels, a winding-drum, means for driving the wheels when the drum is stationary and the drum when the wheels are stationary each at two different speeds and means whereby the driver is prevented from putting both traveling speeds or both winding speeds into gear at the same time.

5. In a traction-engine, the combination of road-wheels, a winding-drum, means for driving the wheels and the drum each at two different speeds, four clutch-levers operating the gearing, a locking-bar moved by the first lever and carrying a hook engaging with the second lever, a second locking-bar moved by the third lever and carrying a projection coming between the first bar and a fixed abutment.

6. In a traction-engine, the combination of a crank-shaft, a second-motion shaft, a pinion fixed on the crank-shaft gearing with a wheel on second-motion shaft, a clutch-lever sliding the wheel on the shaft, a pinion on the crank-shaft, a second clutch-lever sliding the pinion on the shaft, a sleeve on the second-motion shaft, a wheel fixed to the sleeve and gearing with the pinion, a clutch connecting the sleeve to the shaft, a third lever operating the clutch, a pinion free to slide on the boss of the wheel and driving the road-wheels, a fourth clutch-lever operating the pinion, a pinion on the second-motion shaft driving a vertical winding-drum on the side of the engine, a locking-bar moved by the first lever and carrying a hook engaging with the second lever, a second locking-bar moved by the third lever and carrying a projection coming between the first bar and a fixed abutment.

ROBERT HENRY FOWLER.
GEORGE SCHOFIELD TUER.

Witnesses:
I. H. WILLIAMSON,
FRANK ELSWORTH.